US008398298B2

(12) United States Patent
Swader

(10) Patent No.: US 8,398,298 B2
(45) Date of Patent: Mar. 19, 2013

(54) AUTOMATIC POT STIRRER

(76) Inventor: William H. Swader, Akron, NY (US)

( * ) Notice: Subject to any disclaimer, the term of this patent is extended or adjusted under 35 U.S.C. 154(b) by 0 days.

(21) Appl. No.: 13/314,887

(22) Filed: Dec. 8, 2011

(65) Prior Publication Data

US 2012/0147696 A1 Jun. 14, 2012

Related U.S. Application Data

(60) Provisional application No. 61/422,703, filed on Dec. 14, 2010.

(51) Int. Cl.
*B01F 7/20* (2006.01)
*A47J 43/044* (2006.01)

(52) U.S. Cl. ...................... 366/282; 366/284; 366/330.1; 366/330.2; 416/205; 416/220 A

(58) Field of Classification Search ............... 366/326.1, 366/281–284, 330.1, 330.2; 416/217, 218, 416/219 R, 205, 220 A
See application file for complete search history.

(56) References Cited

U.S. PATENT DOCUMENTS

| | | | | | |
|---|---|---|---|---|---|
| 84,901 | A | * | 12/1868 | Pease | 366/170.3 |
| 160,212 | A | * | 2/1875 | Loftus | 416/220 R |
| 226,466 | A | * | 4/1880 | Ward | 416/220 R |
| 317,769 | A | * | 5/1885 | Hammerle | 366/313 |
| 318,864 | A | * | 5/1885 | Buck | 366/283 |
| 350,524 | A | * | 10/1886 | Bowser | 366/164.5 |
| 358,290 | A | * | 2/1887 | Ordway | 366/330.2 |
| 401,306 | A | * | 4/1889 | Wansbrough | 366/284 |
| 431,372 | A | * | 7/1890 | Medlin | 366/149 |
| 628,073 | A | * | 7/1899 | Cornelius | 366/281 |
| 636,559 | A | * | 11/1899 | Robinson | 366/284 |
| 643,947 | A | * | 2/1900 | Cox | 366/164.3 |
| 651,608 | A | * | 6/1900 | Norcross | 366/164.4 |
| 656,123 | A | * | 8/1900 | Kempf | 366/284 |
| 661,724 | A | * | 11/1900 | Newmarker | 415/220 |
| 717,929 | A | * | 1/1903 | Robinson | 366/284 |
| 723,977 | A | * | 3/1903 | Barney | 366/282 |
| 739,422 | A | * | 9/1903 | Jones | 366/247 |
| 754,931 | A | * | 3/1904 | Meyrick | 366/164.4 |
| 808,174 | A | * | 12/1905 | Slear et al. | 416/207 |
| 839,714 | A | * | 12/1906 | Blanchat | 366/281 |
| 1,133,191 | A | * | 3/1915 | Staples | 416/214 R |
| 1,193,954 | A | * | 8/1916 | Walden | 366/343 |
| 1,207,888 | A | * | 12/1916 | Fay | 366/164.4 |
| 1,313,598 | A | * | 8/1919 | Ingells | 416/219 R |
| 1,324,231 | A | * | 12/1919 | Condon | 416/205 |
| 1,399,513 | A | * | 12/1921 | Nyberg | 366/284 |
| 1,421,932 | A | * | 7/1922 | Foster | 185/39 |
| 1,485,552 | A | * | 3/1924 | Colby | 416/206 |
| 1,708,493 | A | * | 4/1929 | Brinkley | 366/249 |
| 1,742,878 | A | * | 1/1930 | Rosenberg | 366/249 |
| 1,878,816 | A | * | 9/1932 | Bucklen | 416/207 |

(Continued)

*Primary Examiner* — David Sorkin
*Assistant Examiner* — Abbas Rashid
(74) *Attorney, Agent, or Firm* — Del Vecchio and Stadler LLP

(57) ABSTRACT

An automatic pot stirrer is provided that has a mount assembly. The mount assembly is mounted on a pot plate having slider clamps. The slider clamps engage the rim of the pot and are designed to accommodate differently dimensioned pots. The mount assembly supports a shaft that is operatively coupled to a motor at one end and threaded to a block at the other end. The block has opposed first and second block end walls and opposed first and second block paddle walls to which are connected paddles. The first and second block paddle walls may be disposed at about a forty-five degree angle to a second block end wall. The paddles are disposed at about a forty-five degree angle to the second block end wall such that the paddles lift food product from the bottom of the pot during operation of the automatic pot stirrer.

14 Claims, 13 Drawing Sheets

U.S. PATENT DOCUMENTS

| | | | | | |
|---|---|---|---|---|---|
| 2,067,410 | A | * | 1/1937 | Newnham | 416/220 R |
| 3,011,768 | A | * | 12/1961 | Clark | 366/285 |
| 3,166,303 | A | * | 1/1965 | Chapman | 366/129 |
| 3,333,831 | A | * | 8/1967 | Chapman | 366/129 |
| 3,357,685 | A | * | 12/1967 | Stephens | 366/282 |
| 4,168,918 | A | * | 9/1979 | de Jonge | 366/138 |
| 4,339,992 | A | | 7/1982 | Kurland | |
| 4,468,130 | A | * | 8/1984 | Weetman | 366/330.2 |
| 4,544,281 | A | * | 10/1985 | Wilkinson | 366/330.1 |
| 4,576,089 | A | * | 3/1986 | Chauvin | 99/332 |
| 4,676,654 | A | * | 6/1987 | Fleckner | 366/98 |
| 4,723,719 | A | * | 2/1988 | Williams | 241/282.2 |
| 4,832,501 | A | | 5/1989 | McCauley | |
| 4,921,356 | A | | 5/1990 | Bordenga | |
| 5,201,263 | A | * | 4/1993 | Teng | 99/335 |
| 5,316,443 | A | * | 5/1994 | Smith | 416/197 R |
| 5,584,656 | A | * | 12/1996 | Rose | 416/132 A |
| 5,762,417 | A | * | 6/1998 | Essen et al. | 366/264 |
| D399,091 | S | * | 10/1998 | Rubin | D7/376 |
| 5,816,136 | A | * | 10/1998 | Stallings | 99/335 |
| 5,938,331 | A | | 8/1999 | Graves | |
| 5,951,253 | A | * | 9/1999 | Gajewski | 416/214 R |
| 6,283,625 | B2 | * | 9/2001 | Frankel et al. | 366/146 |
| 6,334,705 | B1 | * | 1/2002 | Weetman | 366/330.1 |
| 6,491,422 | B1 | * | 12/2002 | Rutten et al. | 366/116 |
| 6,634,784 | B2 | * | 10/2003 | Blakley | 366/330.2 |
| 7,704,465 | B2 | * | 4/2010 | Kato et al. | 422/225 |
| 8,220,986 | B2 | * | 7/2012 | Janz et al. | 366/330.3 |
| 8,277,114 | B2 | * | 10/2012 | Higbee et al. | 366/270 |
| 2009/0060745 | A1 | * | 3/2009 | Douguet et al. | 416/219 R |
| 2009/0214350 | A1 | * | 8/2009 | Martin et al. | 416/219 R |

* cited by examiner

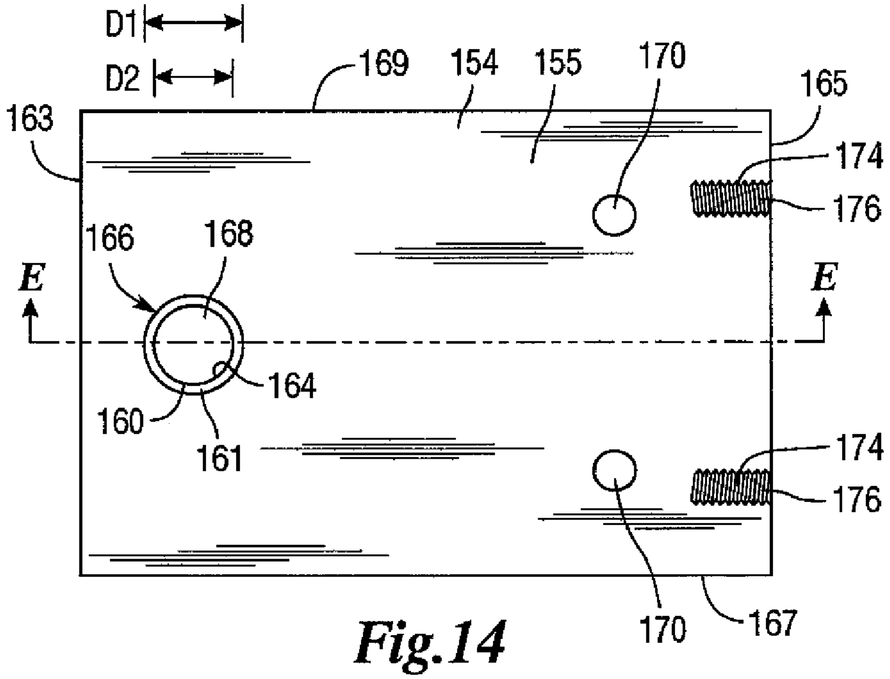
Fig.14
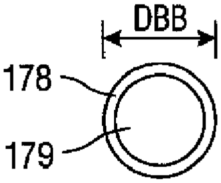
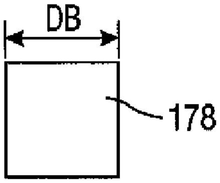
Fig.15 Fig.16
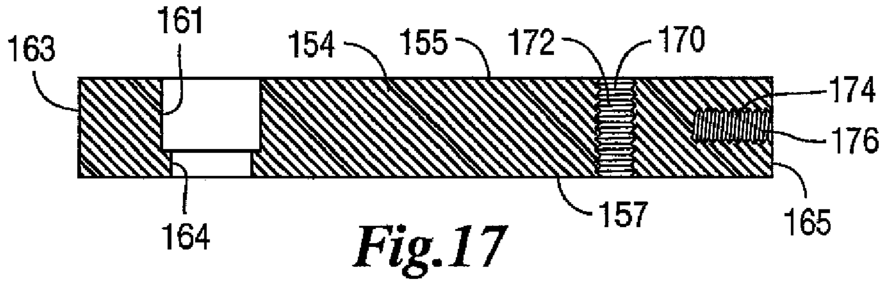
Fig.17
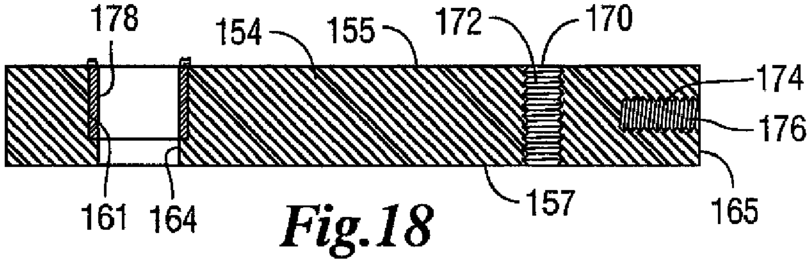
Fig.18

AUTOMATIC POT STIRRER

CROSS REFERENCE TO RELATED APPLICATION

This application claims priority to U.S. Provisional Application having Ser. No. 61/422,703, filed on Dec. 14, 2010, the entire disclosure of which is hereby incorporated herein by reference.

BACKGROUND

While making sauces, stews, soups, chili and the like, many hours of heating along with constant stirring are required in order to ensure that the mixture has a constant temperature throughout and to ensure that the sauce mixture does not burn on the bottom of the pot. Tomato sauce, stews, chili and the like require many hours of constant stirring and low temperature heating. Indeed, some recipes call for up to ten to twelve hours of constant heating and stirring. This constant stirring can be extremely tedious, time-consuming, and physically painful for the individual responsible for the constant stirring.

Thus, it would be very desirable for there to be a reliable, automatic stirrer that can continuously stir the sauce, stew, soup, chili and the like thereby ensuring a constant temperature throughout the mixture and preventing burning of the mixture on the bottom of the pot. Up until now there has not been a convenient and reliable automatic stirrer to continuously stir the sauce, stew, chili and the like.

SUMMARY

An automatic pot stirrer for stirring a pot filled with food product. The automatic pot stirrer has a motor that is operatively coupled to a shaft having opposed blade and motor ends. The blade end of the shaft connects to a paddle assembly. The shaft is supported in a mount assembly, and the mount assembly is mounted on a pot plate that is supported on the pot.

The paddle assembly has paddles and a block. The block has opposed first and second block ends and the block is threaded to the blade end of the shaft. The block has opposed first and second paddle block walls and first and second paddle engaging lips. The first and second paddle block walls are each at about a forty-five degree angle relative to the second end of the block in one of the preferred embodiments. The first paddle engaging lip is at about a forty-five degree angle to the first paddle block wall and the second paddle engaging lip is at about a forty-five degree angle to the second paddle block wall. A paddle is connected to first paddle block wall and another paddle is connected to the second paddle block wall. The paddle connected to the first paddle block wall abuts against the first paddle engaging lip and is at about a forty-five degree angle relative to the second block end. The paddle connected to the second paddle block wall abuts against the second paddle engaging lip and is at about a forty-five degree angle relative to the second block end.

The motor rotates at about ten revolutions per minute and the paddles stir the food product in the pot and lift the food product in the bottom regions of the pot. This causes the temperature of the food product in the pot to be maintained at a substantially constant level and at the same time prevents the food product from burning and from sticking to the bottom of the pot.

DETAILED DESCRIPTION OF THE DRAWING FIGURES

FIG. 14 is a top plan view of a first bar.

FIG. 15 is a top plan view of a bushing.

FIG. 16 is a front elevational view of the bushing.

FIG. 17 is a sectional view of the first bar taken along line E-E of FIG. 14.

FIG. 18 is the view of FIG. 17 after placement of the bushing in a first bar shaft bore.

DESCRIPTION

Figure 1:
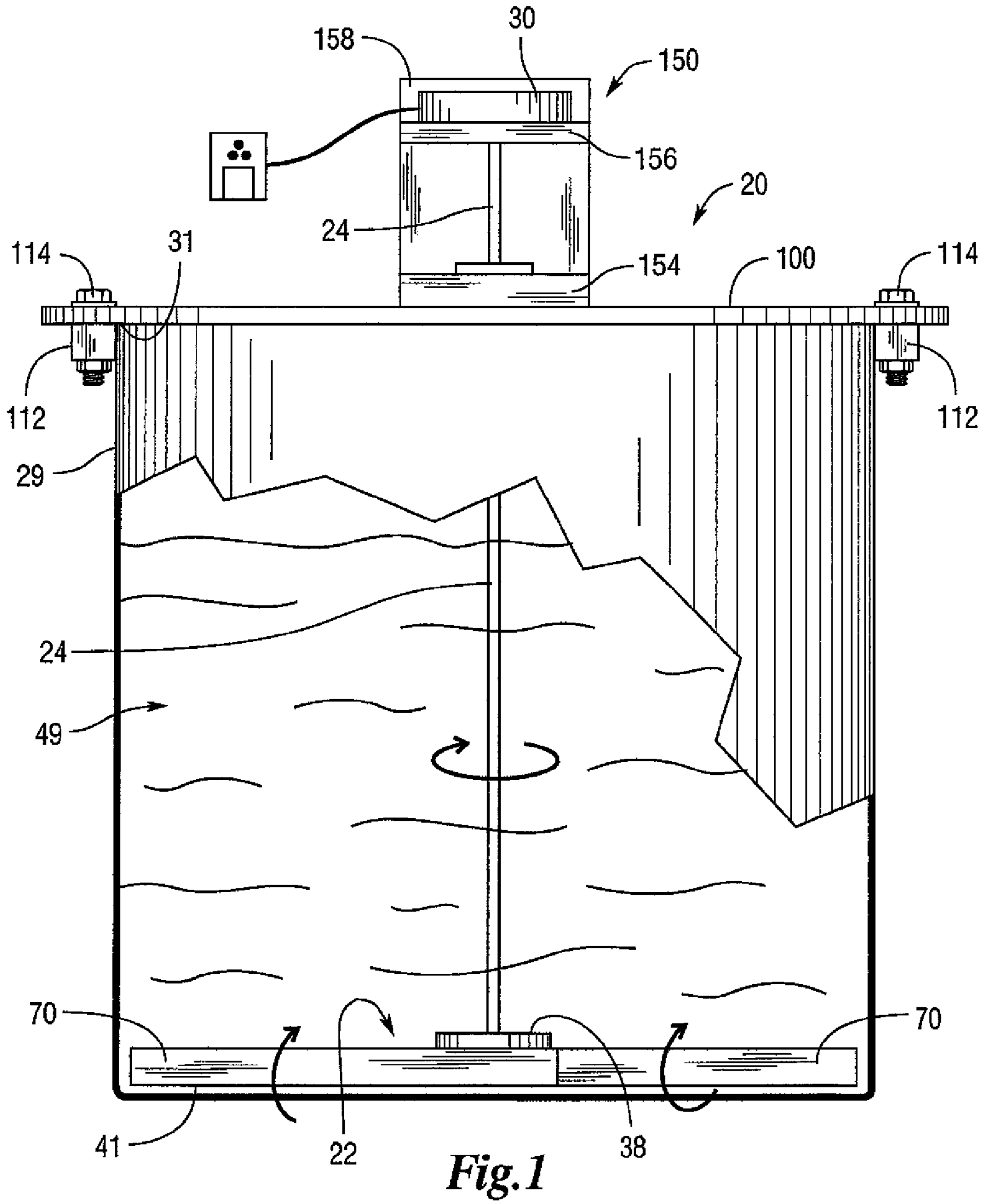
FIG. 1 is a sectional view of a pot and an automatic pot stirrer.

FIG. 1 shows a sectional view of an automatic pot stirrer 20 installed on a pot 29. The automatic pot stirrer 20 includes a blade assembly 22 connected to a shaft 24. The shaft 24 extends through a pot plate 100 and through a mount assembly 150 and is operatively coupled to a motor 30. The automatic pot stirrer 20 is removably clamped to the pot 29.

Figure 3:
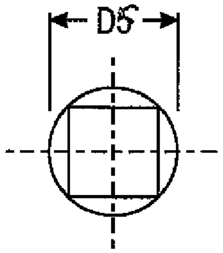
FIG. 3 is a top plan view of the shaft.
Figure 2A:
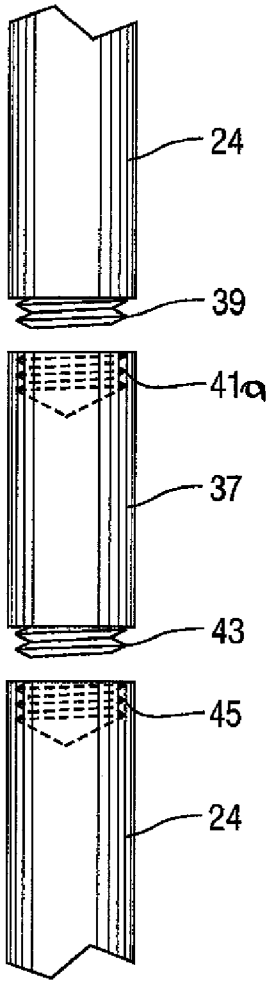
FIG. 2A is a front elevational view a shaft segment for extending or shortening the length of the shaft and wherein the shaft is shown partly in broken line.
Figure 2:
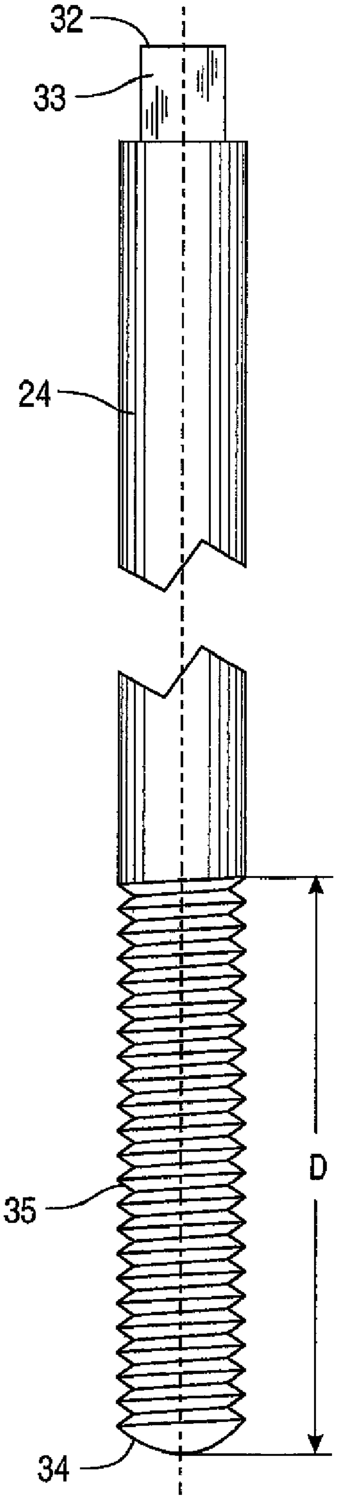
FIG. 2 is a front elevational view of a shaft shown partly in broken line.

FIGS. 2 and 3 show the shaft 24 of the automatic pot stirrer 20. The shaft 24 has a motor end 32, and a motor engagement head 33 is formed at the motor end 32. Opposite the motor end 32 of the shaft 24 is a blade end 34. The shaft 24 has a shaft thread 35 that begins at the blade end 34 and extends a distance designated D along the shaft 24. The distance D is about two inches in one of the preferred embodiments. As shown in FIG. 2A, the shaft 24 may be embodied to have shaft segments 37 so that the user (not shown) can lengthen and shorten the shaft 24 in order to accommodate differently sized pots 29. In this embodiment, the shaft 24 has an external shaft thread 39 that can be threaded to an internal segment thread 41*a*. And, the shaft segment 37 has an external segment thread 43 that can be threaded to an internal shaft thread 45. As many segments 37 as needed may be used to lengthen and shorten the shaft 24 in order to accommodate differently dimensioned pots 29.

Figure 4:
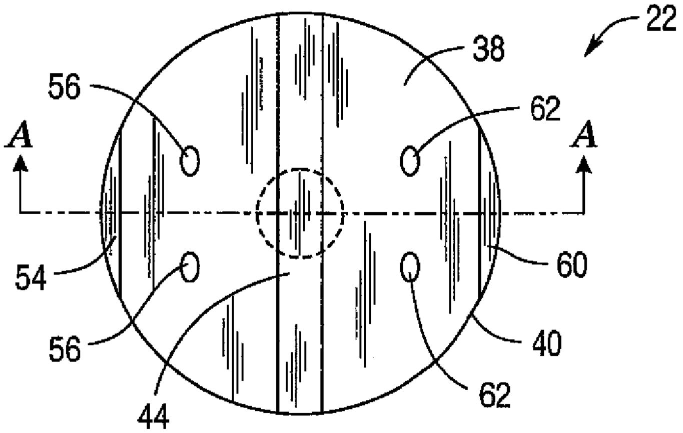
FIG. 4 is a bottom plan view of a block.
Figure 5:
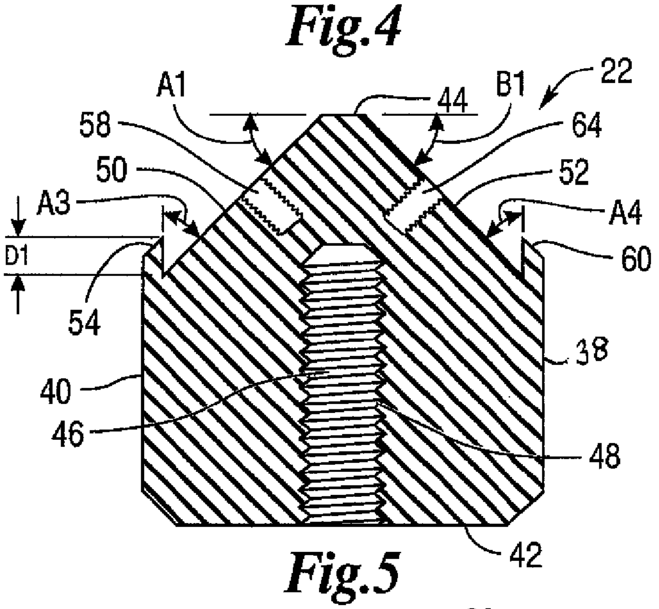
FIG. 5 is a sectional view of the block taken along line A-A of FIG. 4.
Figure 6:
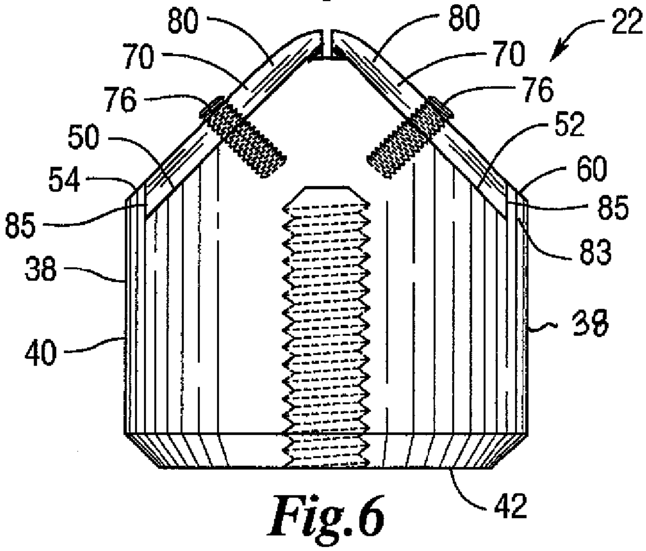
FIG. 6 is a side elevational view of the block with paddles connected to the block.

As shown in FIGS. 4-6 the blade assembly 22 includes a block 38. The block 38 may be embodied to have a cylindrically shaped body 40 as shown, and may be made of aluminum, stainless steel, food grade plastic, combinations thereof or other suitable materials. The block 38 has a first block end wall 42 that is substantially flat and an opposed second block end wall 44 that may be substantially flat. The block 38 defines a shaft opening 46 that extends into the block 38 from the first block end wall 42. The block 38 also has an internal block thread 48. The internal block thread 48 surrounds the shaft opening 46. The shaft thread 35 formed on the shaft 24 is threaded to the internal block thread 48 such that the block 38 and shaft 24 are threaded to one another and thus will rotate at the same rate as shown in FIG. 1.

As shown in FIGS. 5 and 6, the second block end wall 44 meets with first and second block paddle walls 50, 52. The first and second block paddle walls 50, 52 are opposed to one another and are offset from one another by 180 degrees, that is, they are disposed on opposite sides of the block 38 as shown. The first block paddle wall 50 is substantially flat and extends from the second block end wall 44 to a first paddle engaging lip 54. The first paddle engaging lip 54 extends from the cylindrically shaped body 40 of the block 38 a distance D1 beyond the first paddle wall 50. As shown in FIG. 4, the first block paddle wall 50 has a pair of first paddle wall openings commonly designated 56 that are surrounded by first paddle wall internal threads 58. The first paddle wall openings 56 extend into the first block paddle wall 50 in a substantially perpendicular direction in one of the preferred embodiments.

The second paddle block wall 52 is substantially flat and extends from the second block end wall 44 to a second paddle engaging lip 60 that extends from the cylindrically shaped body 40 of the block 38 a distance D1 beyond the second block paddle wall 52. As shown in FIG. 4 the second block paddle wall 52 has a pair of second paddle wall openings commonly designated 62 that are surrounded by second paddle wall internal threads 64. The second paddle wall openings 62 extend into the second block paddle wall 52 in a substantially perpendicular direction in one of the preferred embodiments.

As shown in FIG. 5, the first and second block paddle walls 50, 52 are each at an angle relative to the second block end wall 44. In one of the preferred embodiments the first block paddle wall 50 forms an angle (designated A1 in FIG. 5) of 45° (forty-five degrees) relative to the second block end wall 44. Similarly, the second block paddle wall 52 also forms an angle (designated B1 in FIG. 5) of 45° (forty-five degrees) relative to the second block end wall 44. In other preferred embodiments the angles A1 and B1 may be more or less than 45° (forty-five degrees) and may be the same or different from one another depending on the food product 49 being stirred. In addition, the first block paddle wall 50 is at about a 45° (forty-five degree) angle designated A3 in FIG. 5 relative to the first paddle engaging lip 54. And, the second block paddle wall 52 is at or about a 45° (forty-five degree) angle designated A4 relative to the second paddle engaging lip 60.

Figure 7:
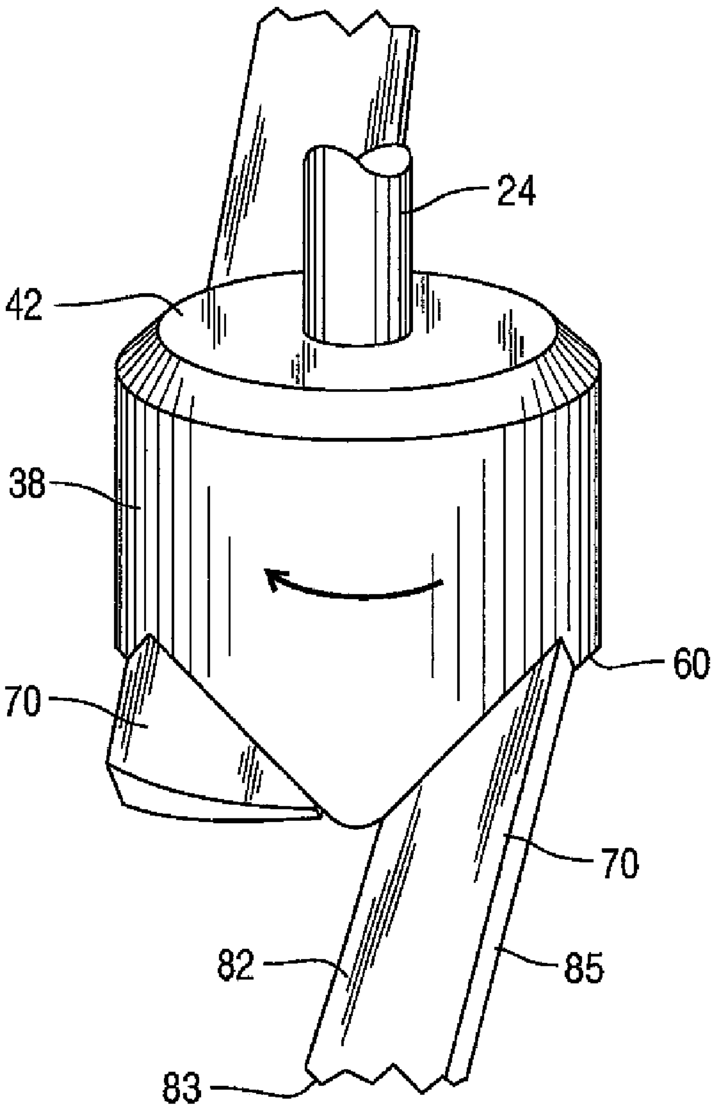
FIG. 7 is perspective view of the paddle assembly showing the block and paddles.
Figure 7A:
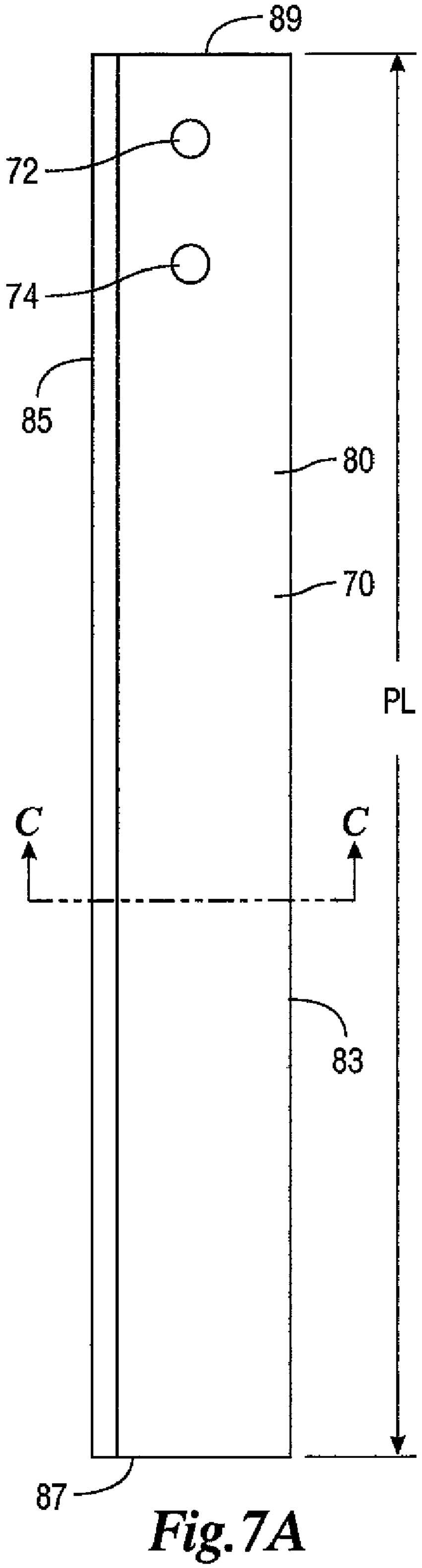
FIG. 7A is a top plan view of the paddle.

The blade assembly 22 also includes paddles commonly designated 70 each having a paddle length designated PL in FIG. 7A and having first and second paddle bores 72, 74. In the embodiment shown in FIG. 1 two paddles 70 are employed. In other preferred embodiments only one paddle 70 is employed. Paddle bolts 76 (FIG. 6) extend through the first and second paddle bores 72, 74 and are threaded to the first paddle wall internal threads 58, thus attaching one of the paddles 70 to the first paddle wall 50. Another paddle 70 is provided and paddle bolts 76 extend through the first and second paddle bores 72, 74 and are threaded to the second paddle wall internal threads 64, thus attaching the other paddle 70 to the second paddle wall 52.

Figure 8:
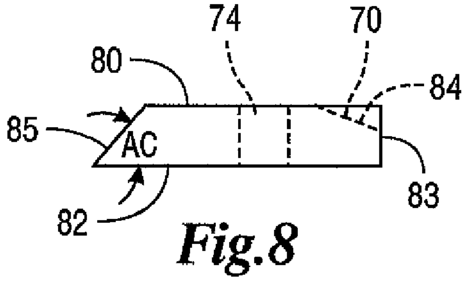
FIG. 8 is a sectional view of the paddle taken along line C-C of FIG. 7A.

As shown in FIGS. 6-8, each paddle 70 has a first paddle side 80 and an opposed second paddle side 82, first and second edge walls 83, 85, and opposed paddle end walls 87, 89. In one of the preferred embodiments the paddle 70 may have a curved or tapered portion 84 (shown in dashed lines in FIG. 8) that extends longitudinally along the paddle 70 and proximal the first edge wall 83 thereof. The curved portion 84 allows for smooth non-damaging flow of the food product 49 over the paddle 70 as the paddle 70 is rotated in the pot 29. The second edge wall 85 is at an angle of about 45 degrees (designated angle AC in FIG. 8) relative to the second paddle side 82. Angle AC is at or about 45 degrees and matches angle A3 that is defined between the first paddle wall 50 and the first paddle engaging lip 54 described above. Thus, the second edge wall 85 of the paddle 70 abuts against the first paddle engaging lip 54 as shown in FIG. 6. The other paddle 70 abuts the second paddle engaging lip 60 in the same manner and is therefore not described herein in detail.

Figure 9:
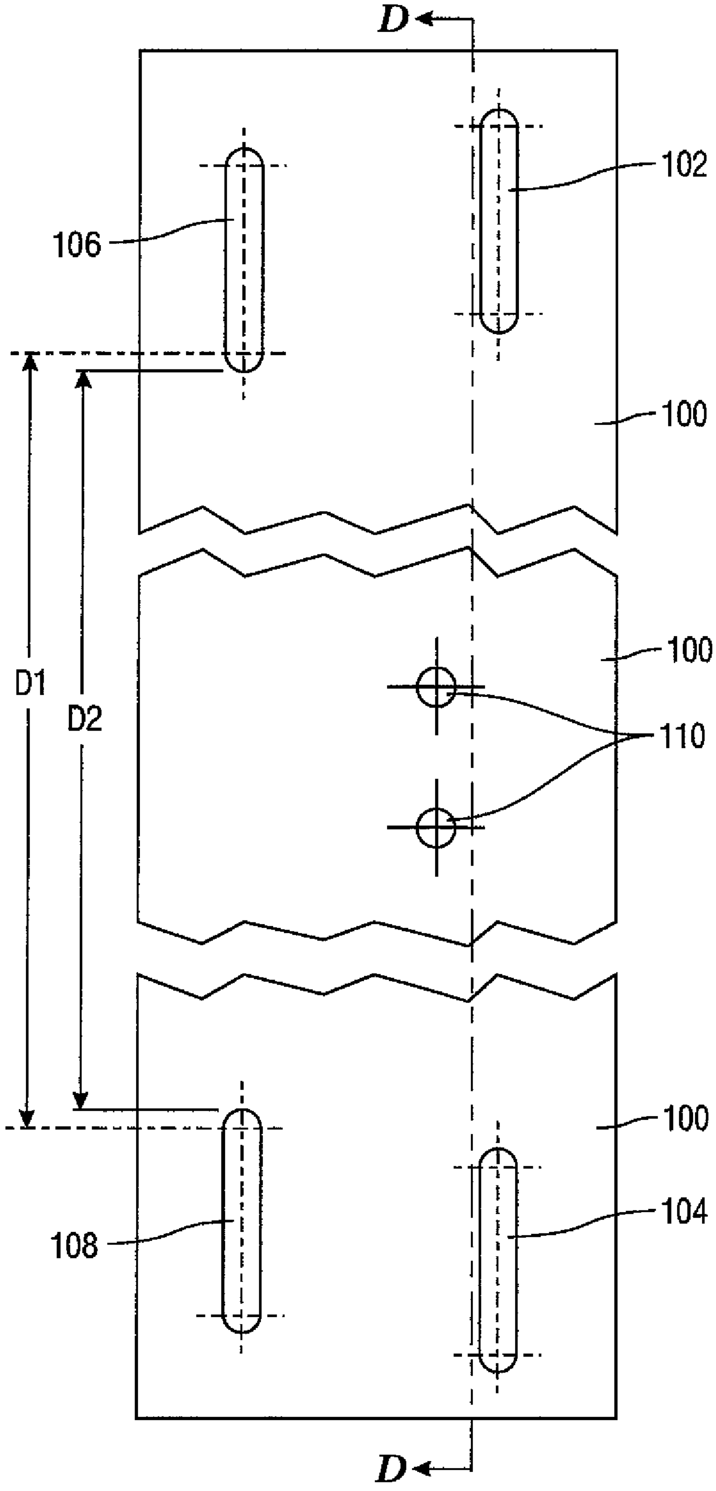
FIG. 9 is a top plan view of a pot plate shown partly in broken line.
Figure 10:
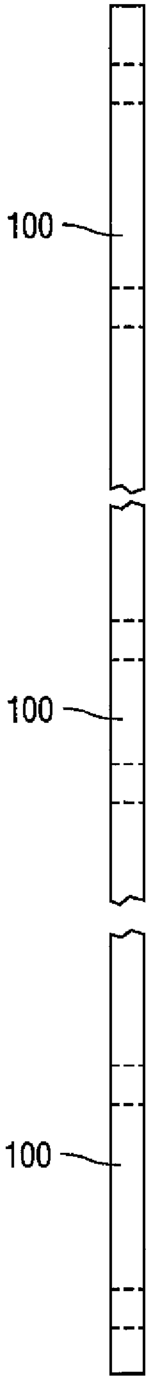
FIG. 10 is a sectional view of the pot plate taken along line D-D of FIG. 9 and shown partly in broken line.

A pot plate 100 is shown in FIGS. 9 and 10. The pot plate 100 defines first and second slider slots 102, 104 that are horizontally aligned and spaced a first slider distance D1 from one another. The pot plate 100 also defines third and fourth slider slots 106, 108 that are horizontally aligned and spaced a second slider distance D2 from one another. The first and second slider slots 102, 104 are substantially parallel to the third and fourth slider slots 106, 108 in one of the preferred embodiments. The first are second slider slots 102, 104 are disposed a greater distance D1 from one another as compared to distance D2 defined between the third and fourth slider slots 106, 108. The pot plate 100 also has a pair of pot plate bores 110. In one of the preferred embodiments the pot plate 100 is about sixteen inches long.

Figure 11:
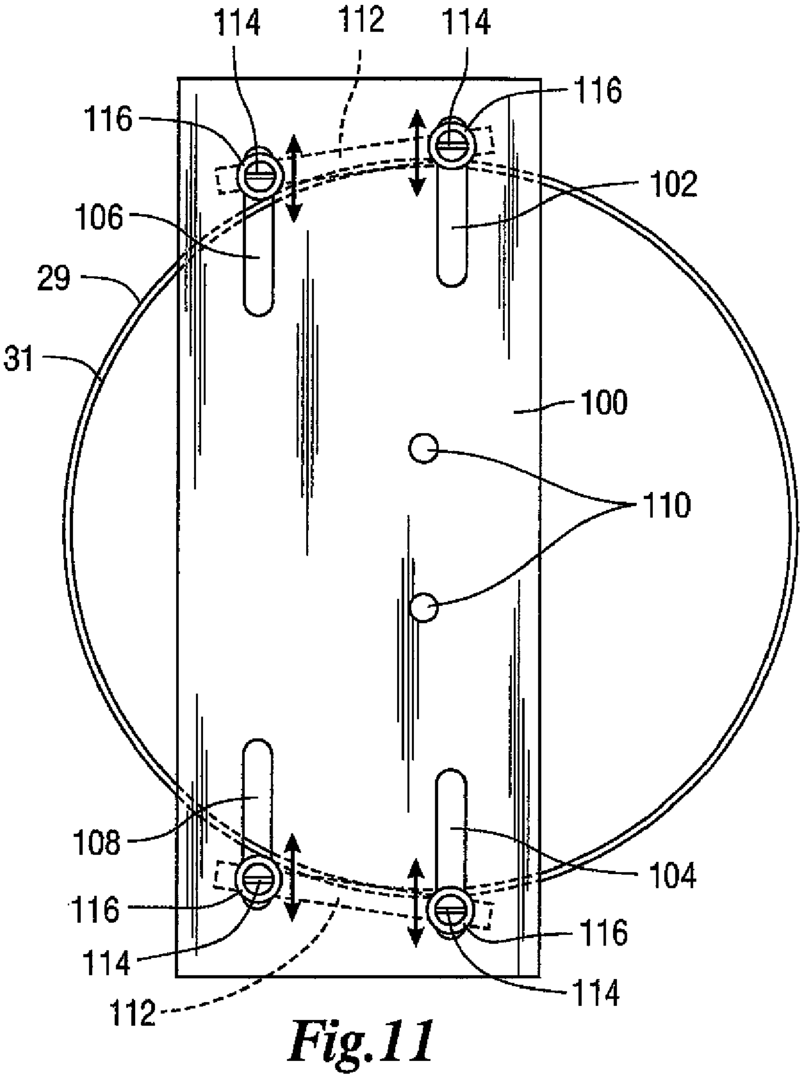
FIG. 11 is a top plan view of the pot plate clamped to a pot.
Figure 12:
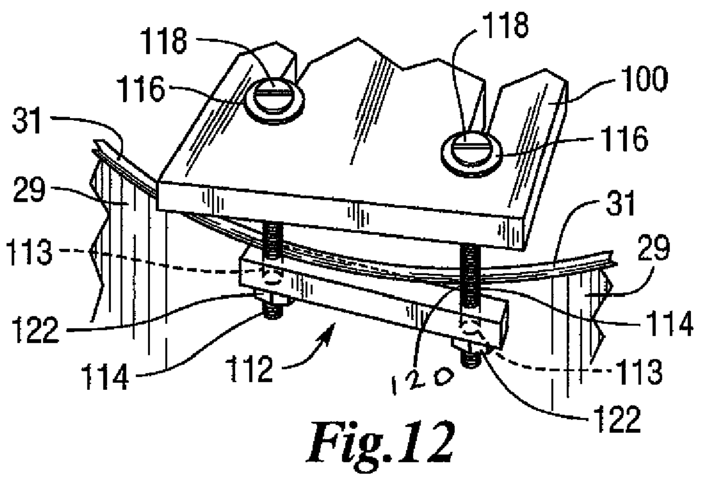
FIG. 12 is a perspective view of a slider clamp when clamped to a lip of the pot (shown partly in broken line).

As shown in FIGS. 11 and 12 the pot plate 100 is attached to the pot 29 with slider clamps commonly designated 112. Each of the slider claims 112 has slider bores 113 through which slider bolts 114 extend. Washers 116 are positioned between the heads 118 of the slider bolts 114 and the slider clamps 112 as shown. Nuts 122 are threaded to the threaded portions 120 of the slider bolts 114. Each slider clamp 112 may be readily adjusted by loosening the slider bolts 114. When attaching the pot plate 100 to the pot 29 each of the slider clamps 112 are moved such that the rim 31 of the pot 29 is disposed between the pot plate 100 and the slider clamp 112. The nuts 122 are then tightened, thus holding the pot plate 100 to the pot 29 as shown in FIG. 12. Thus, because the slider clamps 112 are adjustable the pot plate 100 may be used for differently dimensioned pots 29.

Figure 12A:
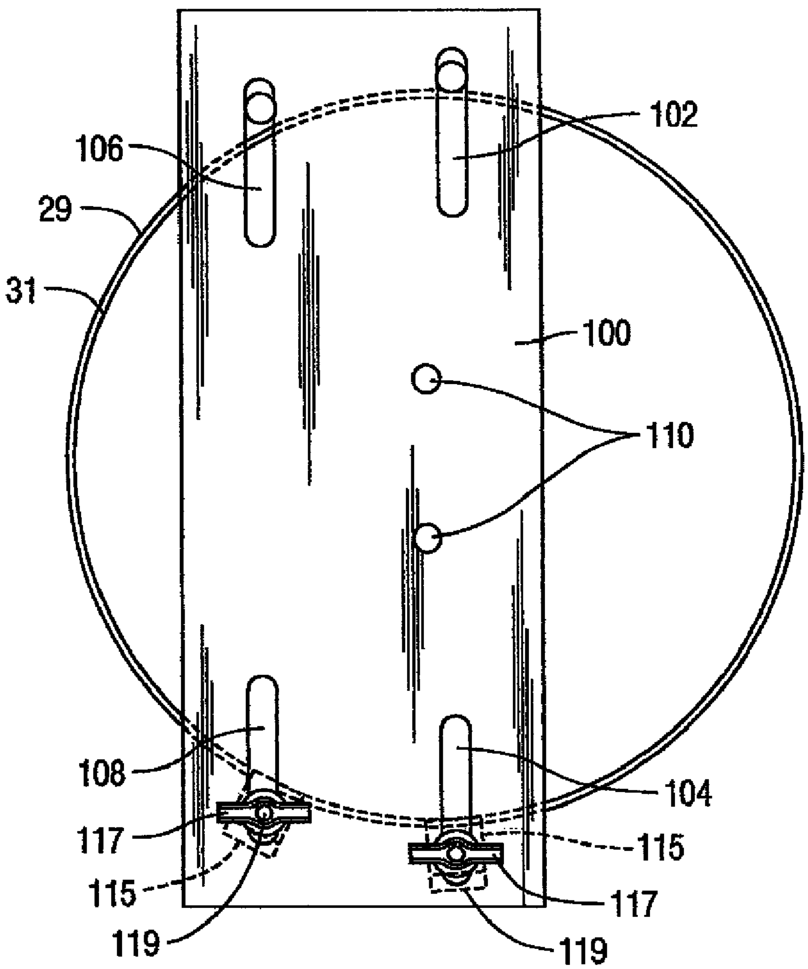
FIG. 12A is a top plan view of the pot plate clamps attached to the pot.
Figure 12B:
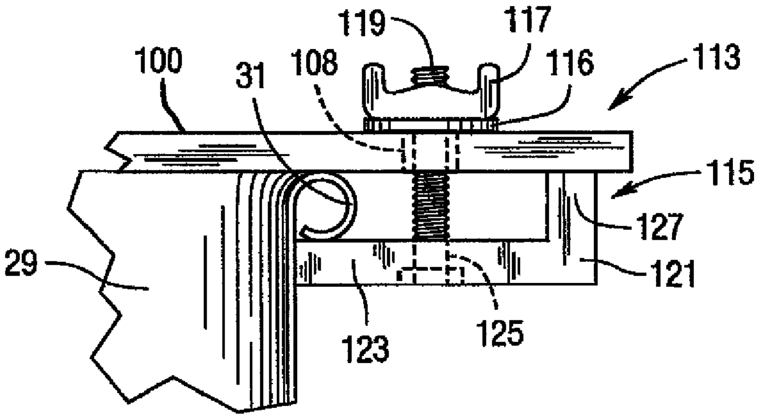
FIG. 12B is an enlarged view of pot plate clamp attached to the pot and the pot plate.

FIGS. 12A and 12B show another embodiment wherein the slider clamps 112 are replaced with pot plate clamp 115 assemblies. Each pot plate clamp assembly 115 includes a wing nut 117, a clamp bolt 119, a clamp body 121 and a washer 116. The clamp body 121 has a first clamp body portion 123 having a clamp bolt bore 125, and a second clamp body portion 127 that extends from the first clamp body portion 123 at about a ninety-degree angle. As shown in FIG. 12B, the rim 31 of the pot 29 is clamped between the pot plate 100 and the first clamp body portion 123 of the clamp body 121, and the clamp bolt 119 extends through the fourth slider slot 108. And, the second clamp body portion 127 abuts against the pot plate 100. Thus, the pot plate clamp assembly 115 attaches the pot plate 100 to the pot 29. Four pot plate clamp assemblies 115 are used to secure the pot 29 to the pot plate 100 and all may be adjusted by way of the previously described first, second, third and fourth slider slots 102, 104, 106 and 108.

Figure 13:
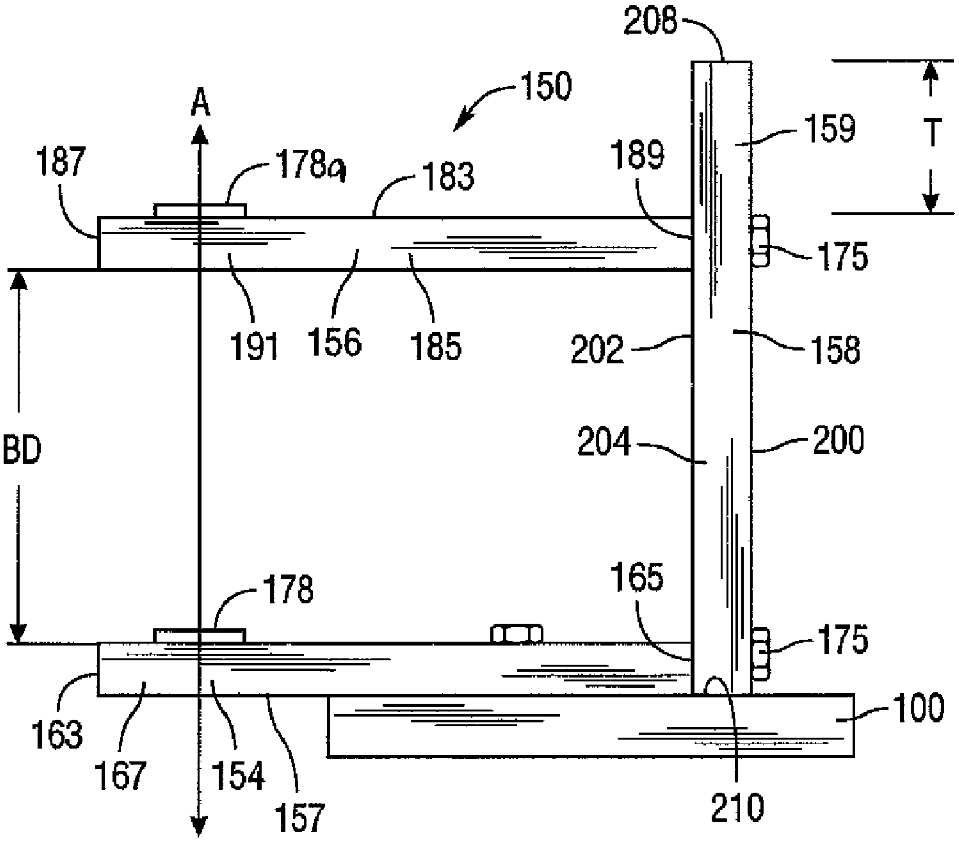
FIG. 13 is a side elevational view of a mount assembly for supporting a motor and for guiding the shaft.

FIG. 13 is a side elevational view of a mount assembly 150 mounted on the pot plate 100 with pot plate bolts 152. The mount assembly 150 is for supporting the motor 30 and guiding the shaft 24 as will be described shortly. The mount assembly 150 includes a first bar 154, a second bar 156, and a support bar 158. The second bar 156 is spaced a bar distance designated BD from and is disposed vertically above the first bar 154, and the support bar 158 connects to the first and second bars 154, 156.

As shown in FIGS. 14-17, the first bar 154 defines a first bar shaft bore 160. An internal surrounding wall 161 having an internal step 164 surrounds the first bar shaft bore 160. The first bar shaft bore 160 has a first portion 166 with a diameter designated D1 and a second portion 168 with a diameter designated D2 wherein D1 is greater than D2. The first bar 154 also has a pair of pot plate bolt openings 170 having internal pot plate threads 172. The first bar 154 defines internally threaded support bar openings 174 having internal threads 176 for receiving support bar bolts 175 (FIG. 13). The first bar 154 also has opposed first and second sides 155, 157, opposed first and second end walls 163, 165 and opposed first and second edge walls 167, 169.

As shown in FIGS. 15 and 16 a first bushing 178 is provided. The first bushing 178 may comprise brass or other suitable material. The first bushing 178 has an exterior diameter DB that is less than the diameter D1 of the first portion 166 of the shaft bore 160. The first bushing 178 has a first bushing opening 179. The internal diameter DBB of the first bushing 178 is greater than the diameter of the shaft 24 (designated DS in FIG. 3) such that the shaft 24 may be received in the first bushing opening 179 in a close fitting relationship and rotatable relationship. FIG. 17 shows a sectional view of the first bar 154 wherein the first bushing 178 is not present. FIG. 18 is the same as FIG. 17 with the addition of the first bushing 178. It is pointed out that the first bushing 178 is press fit into the first portion 166 of the first bar shaft bore 160 in one of the preferred embodiments and extends beyond the first bar 154 in one of the preferred embodiments.

The first bar 154 is connected to the pot plate 100 with pot plate bolts 152 (see FIG. 24) that extend through the pot plate bores 110 and the pot plate bolt openings 170 in the first bar 154. The mount 150 is thus mounted on the pot plate 110 in this manner.

Figure 19:
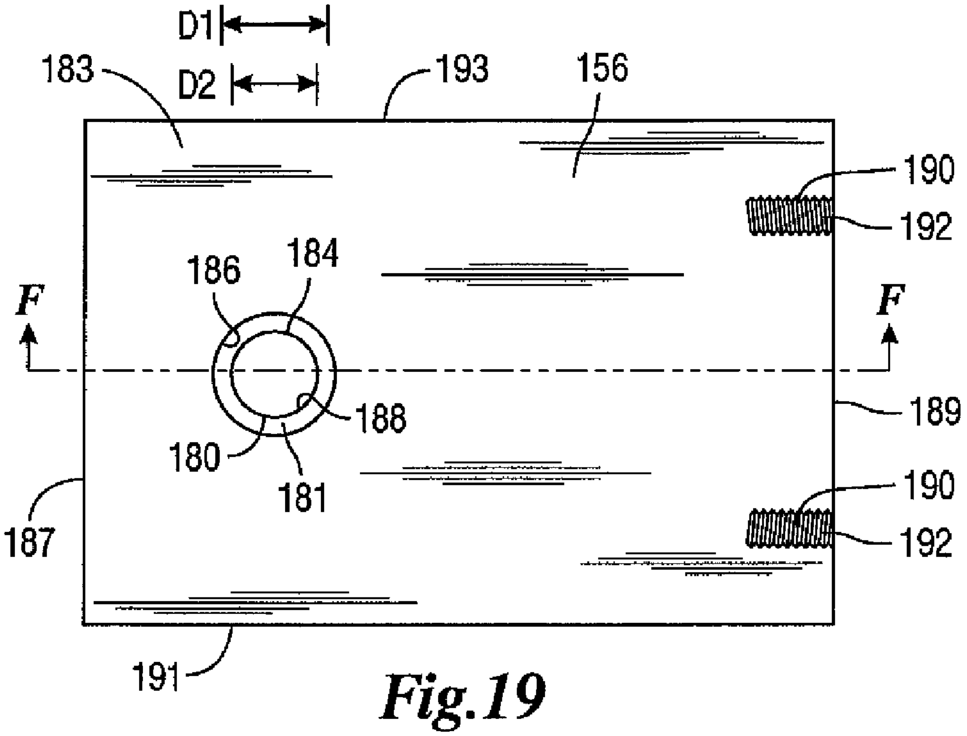
FIG. 19 is a top plan view of a second bar.
Figure 20:
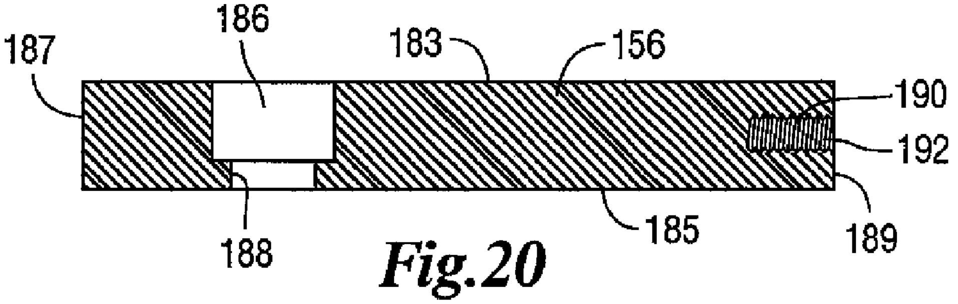
FIG. 20 is a sectional view of the second bar taken along line F-F of FIG. 19.
Figure 21:
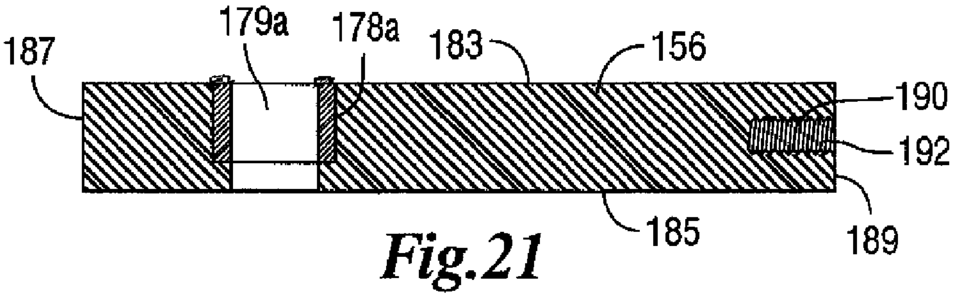
FIG. 21 is a sectional view of the second bar after placement of the second bar bushing in the second bar shaft bore.
Figure 22:
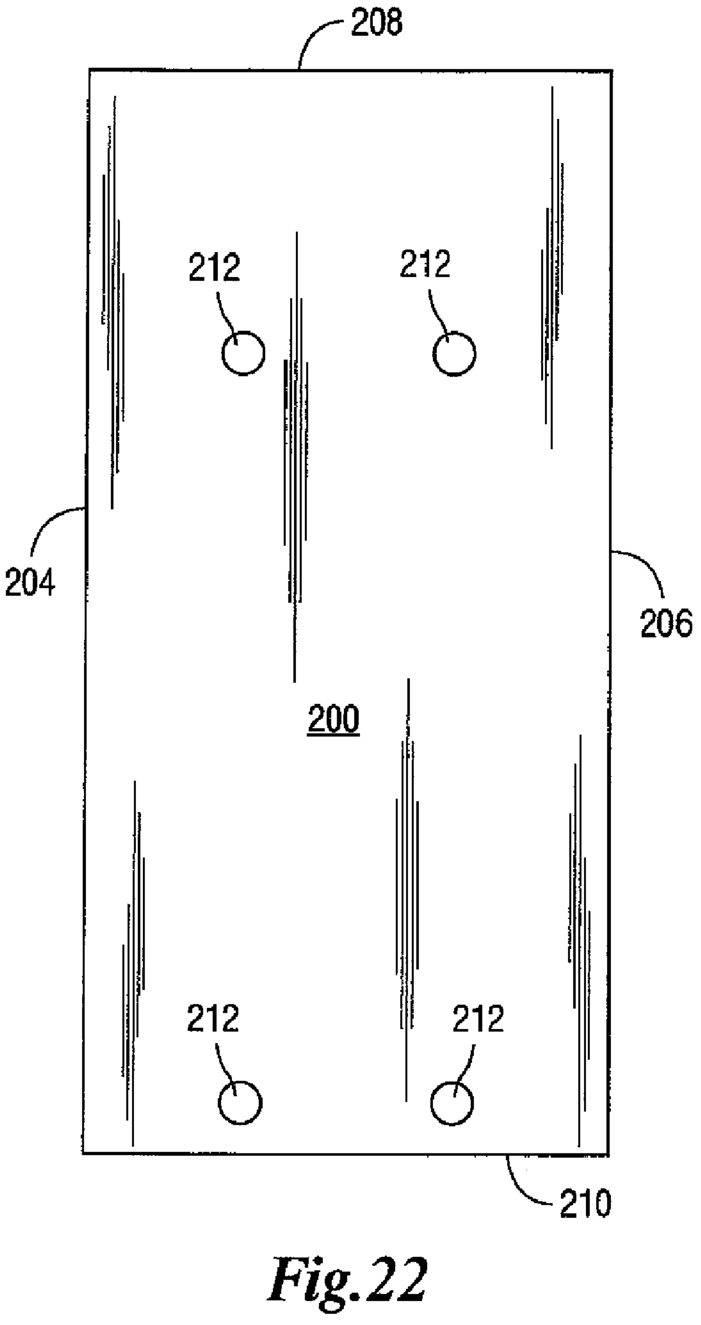
FIG. 22 is a top plan view of a support bar.
Figure 23:
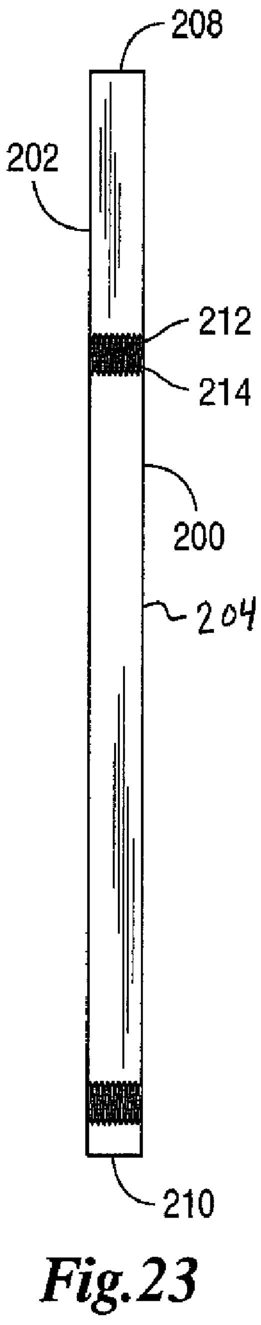
FIG. 23 is a left side elevational view of the support bar.

As shown in FIGS. 19-21 the second bar 156 defines a second bar shaft bore 180. An internal second bar surrounding wall 181 having an internal second bar step 184 surrounds the second bar shaft bore 180. The second bar shaft bore 180 has a first portion 186 with a diameter designated D1 and a second portion 188 with a diameter designated D2 wherein D1 is greater than D2. The second bar 156 also has internally threaded second bar openings 190 having internal threads 192 for receiving support bar bolts 175 (FIG. 13). The second bar 156 also has opposed first and second sides 183, 185, opposed first and second end walls 187, 189, and opposed first and second edge walls 191, 193.

A second bushing 178*a* substantially identical to the first bushing 178 is provided and it has a second bushing opening 179*a*. The second bushing 178*a* has an exterior diameter that is less than the diameter D1 then the first portion 186 of the second bar shaft bore 188. The internal diameter of the second bushing 178*a* is greater than the diameter of the shaft 24 (designated DS in FIG. 3) such that the shaft 24 may be received in the second bushing 178*a* in a close fitting relationship and rotatable relationship. FIG. 20 shows a sectional view of the second bar 156 wherein the second bushing 178*a* is not present. FIG. 21 is the same as FIG. 20 with the addition of the second bushing 178*a*. It is pointed out that the second bushing 178*a* is press fit into the first portion 186 of the second bar shaft bore 180 in one of the preferred embodiments and extends beyond the second bar 156 in one of the preferred embodiments.

Figure 24:
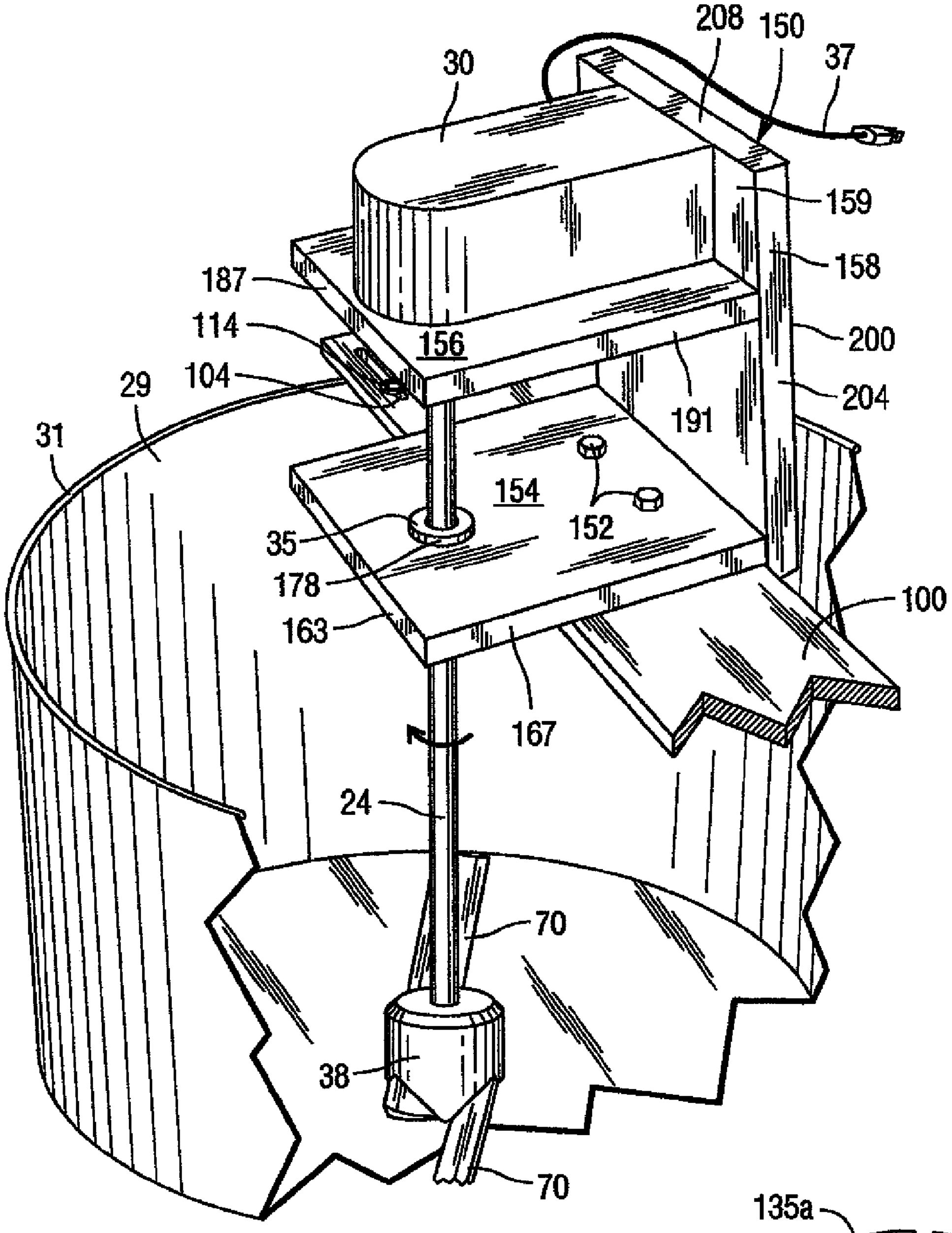
FIG. 24 is a perspective view shown partly in broken line of the automatic pot stirrer installed on a pot.

The first and second bushing openings 179, 179*a* are axially aligned along a bushing axis designated A in FIG. 13, and the shaft 24 is perpendicular to the first and second bars 154, 156, as shown in FIGS. 1 and 24, when the shaft 24 is received in the first and second bushings 178, 178*a*. The mount assembly 150 thus holds the shaft 24 in a perpendicular position 151 (see FIG. 24) relative to the first and second bars 154, 156. This prevents the shaft 24 from shifting position as the motor 30 applies torque to the shaft 24. And, the position of the paddles 70 is thus fixed relative to the pot 29 at all times during rotation of the paddles 70 so that the paddles 70 will not contact the pot 29.

The support bar 158 is shown in FIGS. 13 and 22-24. The support bar 200 has opposed first and second support bar sides 200, 202, opposed first and second support bar end walls 204, 206, and opposed first and second support bar edge walls 208, 210. There are support bar bores 212 defined in the support bar 158 having internal support bar threads 214. As best shown in FIG. 13, support bar bolts 175 are threaded to the support bar threads 214 and the internally threaded support bar openings 174 of the first bar 154. In the same manner, support bar bolts 175 are threaded to the support bar threads 214 and the internal threads 192 of the second bar openings 190 in the second bar 156. The first and second bars 154, 156 extend from and are perpendicular to the support bar 158 such that the mount assembly 150 has a generally C-shaped cross section as shown in FIG. 13.

Figure 25:
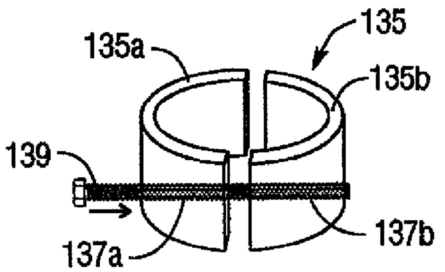
FIG. 25 is a perspective view of a stop ring.

FIG. 24 is a perspective view of the mount assembly 150 mounted on the pot bar 100 that, in turn, is mounted on the pot 29 in the manner previously described. The motor 30 is shown is also shown. As shown in FIGS. 24 and 25, attached to the shaft 24 is a stop ring 135 that has a first half 135*a* and a second half 135*b*. The first half 135*a* has at least one first half internally threaded ring bore 137*a* and the second half 135*b* has at least one internally threaded second half bore 137*b*. A stop ring screw 139 is provided and is threaded to the at least one first half internally threaded ring bore 137*a* and the at least one internally threaded second half bore 137*b* such that the first and second halves 135*a*, 135*b* abut one another. The stop ring 135 is adjusted by loosening the stop ring screw 139 such that the stop ring 135 is movable along the shaft 24, allowing the user to adjust the shaft 24 relative to the pot 29. The stop ring 135 abuts against the first bushing 178 in one of the preferred embodiments. In addition, the stop ring 135 prevents the shaft 24 from sliding out of mount assembly 150. And, the stop ring 135 prevents the shaft 24 and paddles 70 from contacting an interior bottom 41 of the pot 29 during rotation of the shaft 24. The stop ring 135 may be variously embodied and in other preferred embodiments the stop ring 135 is an adjustable clamp. Stop rings are well known to those having ordinary skill in the art. Also shown in FIG. 24 is the motor 30 and cord 27. The motor 30 is preferably a heat resistant type motor 30, for example a rotisserie-type motor that is capable of stirring the food product 49 in the pot 29 at about ten revolutions per minute. The construction and use of motors 30 capable of rotating at 10 revolutions per minute are well known to those having ordinary skill in the art and are therefore not described herein in greater detail. It is pointed out that the second bar 156 supports the motor 30 thereon and the motor 30 is adapted to engage the motor engagement head 33 is formed at the motor end 32 of the shaft 24. The shaft 24 rotates in the first and second bushings 178, **178*a* so that frictional wear and resistance is minimal during operation of the pot stirrer 20. In addition, it is pointed out that the support bar 158 extends a distance designated T in FIG. 13 beyond the second bar 156 such that the support bar 158 has a stop wall portion 159 that spans from the second bar 156 to the first support edge wall 208. The stop wall portion 159 will prevent the motor 30 from rotating on the second bar 156 as the motor 30 rotates the paddles 70**.

As shown in FIGS. 1 and 24, the mount assembly 150 advantageously centers the paddles 70 in the pot 29 such that the paddles 70 do not contact the pot 29 during rotation. The shaft 24 extends through the first bushing 178 in the first plate 154 and the second bushing **178*a* in the second plate 156, and this structural arrangement holds the shaft 24 in a vertical position at all times when the pot plate 100 is secured to the pot 29. Thus, the paddles 70 are unable to contact the pot 29 when rotating the food product 49 that may, in some situations, be quite thick and have a high viscosity. In one of the preferred embodiments the paddles 70 are set about 0.25 inches from the interior bottom 41 of the pot 29 so that no food product 49 sticks to the interior bottom 41 of the pot. The clockwise rotation of the shaft 24 and paddles 70 and the angle the paddles 70 make relative to the block 39 results in the continuous lifting and circulation of the food product 49 disposed in the bottom regions of the pot 29. This prevents burning of the food product 49 and the sticking of the food product 49 to the pot 29. The automatic pot stirrer 20 thus frees up time for the user so he or she can engage in other activities, as there is virtually no need at any time to manually stir the food product 49 in the pot 29**.

In addition, it is to be understood that the support bar bolts 175, paddle bolts 76, and the pot plate bolts 152 allow for the rapid and easy assembly and disassembly of the automatic pot stirrer 20 for cleaning, storage, and packaging of the automatic pot stirrer 20. In addition, the automatic pot stirrer 20 may be sold in its unassembled state so as to be able to fit in a small-dimensioned box. It is to be understood that the pot plate 100 and the paddles 70 may be variously dimensioned so as to be able to be fitted in and support on pots 29 having different capacities, for example 2 gallon pots, 3 gallon pots, 5 gallon pots and the like. The length of the shaft 24 may also be adjusted by the use of the previously described shaft segments 37 so as to be able to accommodate differently sized pots 29. It is to be understood that in other preferred embodiments the support bar bolts 175 and pot plate bolts 152 could be replaced with suitable welds.

It will be appreciated by those skilled in the art that while the automatic pot stirrer 20 has been described in connection with particular embodiments and examples, the automatic pot stirrer 20 is not necessarily so limited and that other examples, uses, modifications, and departures from the embodiments, examples, and uses may be made without departing from the automatic pot stirrer 20. All these embodiments are intended to be within the scope and spirit of the appended claims.

What is claimed:

1. An automatic pot stirrer comprising:

a mount assembly;

a pot plate connected to the mount assembly;

a shaft having opposed blade and motor ends supported by the mount assembly;

a block having opposed first and second block end walls and wherein the first block end wall is threaded to the blade end of the shaft;

the block is a cylindrical shaped body and the cylindrical shaped body is formed with first and second paddle block walls that are offset from one another by one hundred eighty degrees on the cylindrical shaped body, and each of the first and second paddle block walls is at about a forty-five degree angle relative to the second block end wall of the cylindrical shaped body, and the second block end wall meets with the first and second paddle block walls;

the first paddle block wall of the cylindrical shaped body is flat and extends to a first paddle engaging lip, and the first paddle engaging lip extends beyond the first paddle block wall such that the first paddle engaging lip is at an angle relative to the first paddle block wall;

the second paddle block wall of the cylindrical shaped body is flat and extends to a second paddle engaging lip, and the second paddle engaging lip extends beyond the second paddle block wall such that the second paddle engaging lip is at an angle relative to the second paddle block wall, and the angle is the same as the angle the first paddle engaging lip makes with the first paddle block wall;

a pair of paddles each having opposed first and second edge walls and opposed first and second paddle sides, and the second edge wall is at an angle relative to the second paddle side, and the angle is the same as the angle the first paddle block wall makes with the first paddle engaging lip and the same as the angle the second paddle block wall makes with the second paddle engaging lip;

the second paddle side of one of the paddles abuts the first paddle block wall, and the second edge wall of the paddle abuts the first engaging lip and wherein only the second paddle side and second edge wall of the paddle contact the cylindrical shaped body;

the second paddle side of the other paddle abuts the second paddle block wall, and the second edge wall of the another paddle abuts the second engaging lip and wherein only the second paddle side and second edge wall of the other paddle contact the cylindrical shaped body; and, the paddle is connected to the first paddle block wall of the cylindrical shaved body and the other paddle is connected to the second paddle block wall of the cylindrical shaped body.

2. The automatic pot stirrer according to claim 1 wherein the mount assembly includes:

a first bar;

a second bar; and, a support bar wherein the first bar is connected to the pot plate and the support bar, and the second bar is connected to the support bar such that the second bar is disposed vertically above the first bar.

3. The automatic pot stirrer according to claim 2 wherein the first bar has a first bushing with a first bushing opening and the second bar has a second bushing with a second bushing opening wherein the first and second bushing openings are axially aligned along a bushing axis and the shaft extends though the first and second bushing openings.

4. The automatic pot stirrer according to claim 1 wherein the pot plate includes:

first and second slider slots; and, third and fourth slider slots wherein the first and second slider slots are disposed a distance from one another that is greater than the distance between the third and fourth slider slots.

5. The automatic pot stirrer according to claim 4 further including:

slider clamps having slider bores; and, slider bolts and wherein the slider bolts extend through the slider clamps and the pot plate such that the slider clamps are releaseably attachable to the pot plate.

6. The automatic pot stirrer according to 1 wherein the angle is about forty-five degrees.

7. The automatic pot stirrer according to claim 1 wherein the paddle is formed with a curved portion that extends longitudinally along the paddle and along the first edge wall of the paddle.

8. The automatic pot stirrer according to claim 1 wherein the first paddle block wall defines a pair of first paddle wall openings each surrounded by first paddle wall internal threads, and the second paddle block wall defines a pair of second paddle wall openings each surrounded by second paddle wall internal threads and one of the paddles is connected to the first paddle block wall and the other paddle is connected to the second paddle block wall with paddle bolts threaded to the first and second paddle wall internal threads.

9. The automatic pot stirrer according to claim 8 wherein the pair of first paddle wall openings are perpendicular to the first paddle block wall and the pair of second paddle wall openings are perpendicular to the second paddle block wall.

10. The automatic pot stirrer according to claim 2 wherein the support bar has a stop wall portion that extends beyond the second bar and wherein a motor is supported on the second bar and operatively coupled with the shaft such that the stop wall portion abuts against the motor in order prevent the rotation of the motor when the motor rotates the shaft.

11. The automatic pot stirrer according to 10 wherein the motor rotates at about ten revolutions per minute.

12. An automatic pot stirrer comprising:

a motor;

a shaft having opposed blade and motor ends and wherein the motor end is operatively coupled to the motor;

a paddle assembly having paddles and a block with opposed first and second block end walls wherein the first block end wall is threaded to the blade end of the shaft;

the block is a cylindrical shaped body that is formed with first and second paddle block walls that are offset from one another by one hundred eighty degrees on the cylindrical shaped body, and each of the first and second paddle block walls is at about a forty-five degree angle relative to the second block end wall, and the second block end wall meets with the first and second paddle block walls;

the cylindrical shaped body is formed with offset first and second paddle engaging lips, and the first paddle engaging lip is at about a forty-five degree angle to the first paddle block wall and the second paddle engaging lip is at about a forty-five degree angle to the second paddle block wall, and one of the paddles is connected to first paddle block wall and another of the paddles is connected to the second paddle block wall; and, wherein the paddle connected to the first paddle block wall only abuts against the first paddle block wall and the first paddle engaging lip and is at about a forty-five degree angle relative to the second block end wall, and the other paddle connected to the second paddle block wall only abuts against the second paddle block wall and the second paddle engaging lip and is at about a forty-five degree angle relative to the second block end wall such that each of the first and second paddle block walls slope towards the second block end wall.

13. The automatic pot stirrer according to claim 12 further including a support bar and a first bar and a second bar each connected to the support bar and wherein the shaft extends though the first and second bars and is capable of rotating, and a stop ring is disposed on the shaft between the first and second bars.

14. The automatic pot stirrer according to claim 13 wherein the stop ring is adjustable relative to the shaft and prevents the shaft from sliding out of the first and second bars.

* * * * *